United States Patent Office 2,993,821
Patented July 25, 1961

2,993,821
BONDING COMPOSITIONS

Paul F. Gunberg, Ridgewood, and Paul Viohl, Ramsey, N.J., assignors to United States Rubber Company, New York, N.Y., a corporation of New Jersey
No Drawing. Filed Oct. 8, 1957, Ser. No. 688,842
16 Claims. (Cl. 154—46)

This invention relates to a new class of elastomeric mixtures, to their use as bonding compositions, and to elastomeric laminated articles embodying the bonding compositions. More particularly, the invention relates to mixtures containing a highly unsaturated rubber, a chemical adduct of maleic anhydride and butyl rubber, and distinct vulcanizing agents for, respectively, the highly unsaturated rubber and the adduct.

The invention of these new mixtures solves two major problems of the rubber industry.

First, mixtures of highly unsaturated rubbers with butyl rubber, especially those mixtures which contain a major amount of butyl, cured to give products which are much poorer than either cured rubber alone. This is due to the fact that the highly unsaturated rubber reacts with sulfur or other conventional curing agents so much faster than butyl rubber does that the former rubber is overcured or else the butyl rubber is undercured. Thus, it is impossible to prepare conventionally cured products, from such rubber mixtures, which will retain enough of the good properties of the individual cured rubbers to have any practical value.

Second, butyl rubber does not adhere well to highly unsaturated rubbers, partly at least because the sulfur or other curing agent migrates across the interface between the two rubbers so that the differential rate of cure again causes poor balance of cure of the two rubbers. In other words, the highly unsaturated rubber "robs" the butyl of sulfur.

These difficulties are most unfortunate because mixtures which would retain the good properties of both rubbers would be expected to be valuable, particularly if they acted as adhesives to bond butyl to other rubbers.

An object of the invention is to provide a novel vulcanizable composition, and one which can be used to obviate the aforesaid disadvantages. Other objects will be apparent from the detailed description which follows.

We use herein the terms "chemical adduct" and "adduct" to mean a product of chemical reaction between butyl rubber and maleic anhydride.

The "butyl rubbers" are the rubbery copolymers made from a major amount of isobutylene and a minor amount of a conjugated diolefin hydrocarbon in the presence of a Friedel-Crafts type of catalyst. Usually, these copolymers are composed of isobutylene and the diolefin in proportions ranging from 90:10 to 99.5:0.5, most often 95:5 to 99.5:0.5. The diolefin is usually isoprene, but can also be another hydrocarbon containing from 4 to 6 carbon atoms, e.g., butadiene, piperylene or 2,3-dimethylbutadiene, etc. The isobutylene:isoprene rubbers also are called "IIR" and formerly "GR–I."[1]

According to the invention, the composition to be vulcanized comprises a mixture of a highly unsaturated rubber (which can be natural rubber or any sulfur-vulcanizable synthetic rubber which has an amount of olefinic unsaturation on the order of that occurring in Hevea) and a chemical adduct of the butyl rubber with maleic anhydride, and separate and distinct vulcanizing agents for the rubber and the adduct. For the highly unsaturated rubber, sulfur is generally used, but other conventional curing agents such as p-quinone dioxime (GMF) and dibenzoyl p-quinone dioxime (Dibenzo GMF) also can be used. The amount of curing agent per 100 parts, by weight, of the said rubber, and the amount and type of other compounding ingredients such as accelerators, activators, fillers, antioxidants, etc., are the same as those conventionally used with such rubber alone. For the adduct, metallic oxides such as zinc oxide, magnesium oxide, litharge, calcium oxide, and barium oxide are used. Of these zinc oxide is preferred. The amount of the oxide generally ranges, by weight, from about 4 to about 20 parts based on 100 parts of the adduct. This is in addition to any amount of the oxide needed to aid in the sulfur cure of the highly unsaturated rubber.

The rates of cure of the two materials can be adjusted independently of each other because they are cured by different vulcanizing agents which do not interfere with one another. The sulfur has little or no effect on the cure of the adduct. The metallic oxide, especially zinc oxide, is, of course, often used as an aid in conventional sulfur cures of elastomers. However, that causes no problem in the operation of this invention because any excess of the oxide over that needed to cure the adduct merely acts on the adduct like an inert filler and because the oxide does not migrate from one layer of a laminated material to the next.

The two aspects of the invention will now be described in detail. For brevity, we shall illustrate the invention with Hevea rubber as a typical highly unsaturated rubber. However, any of the other highly unsaturated sulfur-vulcanizable rubbers mentioned hereinafter can be used instead of Hevea in the operation of the invention unless otherwise stated.

The first aspect of the invention is concerned with the vulcanizates per se of mixtures of, say, Hevea rubber and adducts of butyl rubber and maleic anhydride. Such vulcanizates are useful in making bulk articles which will have a desirable combination of properties which the separate rubbers Hevea and butyl lack. For example, the mixtures can be used to make a white tire sidewall stock which will adhere well to the Hevea or to other carcass understock and at the same time will resist ozone cracking extraordinarily well. Heretofore, it has been very difficult, if not impossible, to obtain good resistance to ozone cracking in a white sidewall. Hevea and the other highly unsaturated sulfur-vulcanizable rubbers adhere well to each other, but do not withstand ozone attack unless a dark-colored antioxidant is present. Naturally, such a staining antioxidant cannot be used in a white stock. On the other hand, butyl rubber innately resists ozone attack extremely well, and thus does not need a staining antioxidant, but the stock does not adhere well to the highly unsaturated rubber. Our new stocks both adhere well to the highly unsaturated rubber and resist ozone cracking exceedingly well.

In this very important use for the vulcanized mixtures of this invention, carbon black and other dark-colored materials are not suitable. Likewise, a metallic- ---
[1] The new codes IIR, NBR, PBR, SBR, etc. are recommended by Rubber World, April 1957, page 55, and tentatively recommended by the American Society for Testing Materials in the 1956 "Supplement to Book of ASTM Standards Including Tentatives—Part 6, Plastics, Electrical Insulation, Rubber, Electronic Materials," page 201, ASTM D1418–56T.

oxide curing agent which is dark-colored or can be oxidized further to a dark-colored material, or which can form a dark-colored sulfide, cannot be used in this application of the invention. Thus, litharge, magnesium oxide, and to some extent barium oxide are unsuitable. Zinc oxide and calcium oxide are satisfactory.

However, for dark-colored articles, carbon black, the metallic oxides precluded just above, and other dark-colored conventional compounding agents can be used in the operation of this invention.

The second aspect of the invention is concerned with the use of the new vulcanizates as adhesive films and tie-gums to bond a highly unsaturated sulfur-vulcanizable rubber to butyl, or to a mixture of Hevea, say, and adduct as described above, when such mixture contains a higher proportion of the adduct than does the intermediate adhesive layer. It is also concerned with the laminated products thus formed.

Preferably, there are used at least two intermediate tie-gum layers between the highly unsaturated rubber and the butyl, for two reasons. First, adhesion between one layer and the next is better when the elastomer compositions of two adjacent layers do not differ greatly, than it is between two layers of widely differing composition. Second, the intermediate layer next to the butyl rubber preferably should contain a minor amount of the highly unsaturated rubber because migration of sulfur from the butyl sometimes causes sufficient overcure of the other rubber in the adjacent layer to make the laminated product unsuitable for its intended use. However, for some purposes (see, e.g., next paragraph) these preferred techniques are not necessary. Therefore, in the broad operation of this invention we are not limited to the preferences shown.

The weight proportion of highly unsaturated rubber to butyl adduct in a mixture of this invention can range broadly between about 95:5 and about 5:95, and preferably between about 75:25 and about 10:90. For any specific use a proportion is chosen which will give the best combination of properties which are important for that particular use. For example, the white sidewall stock mentioned above preferably contains the rubber and the adduct in a proportion ranging between about 50:50 and about 25:75. If the amount of the rubber is more than about 50 parts, the ozone-cracking resistance of the sidewall will not be enough better than that of a white Hevea or SBR (formerly called GR–S) sidewall to justify its extra cost; if the amount of the rubber is less than about 25 parts the sidewall will not adhere adequately directly to the carcass stock. Of course, a sidewall containing a still higher proportion of the adduct can be used if one or more intermediate adhesive layers illustrating the second part of this invention are employed. Such laminated tires are intended to illustrate our invention.

The sulfur-vulcanizable synthetic rubbers are generally homopolymers of conjugated diolefins, and heteropolymers thereof with one or more copolymerizable mono-olefinic compounds. Typical of the latter are styrene; the methylstyrenes, the acrylic and methacrylic nitriles, amides, acids, and esters; the monovinylpyridines; the fumaric esters; vinylidene chloride; methyl vinyl ketone, and methyl isopropenyl ketone.

The conjugated diolefin used in making the highly unsaturated elastomers preferably contains from four to six carbon atoms. Commonly, we use butadiene, but we can also use isoprene, piperylene, or 2,3-dimethylbutadiene.

The diolefin:styrene copolymers are generically termed SBR and formerly as GR–S. They can be made by any of the commonly known methods of copolymerization, e.g., in aqueous emulsion at 50° C., 5° C., or –15° C.

The methylstyrene used can be alpha-methylstyrene, ortho-, meta-, or para-methylstyrene, or a mixture of any of them.

The acrylic-type compound is one having the structure

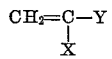

wherein X is hydrogen or methyl, and Y is —CN,

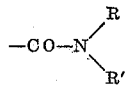

or COOR, where R and R' are hydrogen, alkyl or aralkyl groups. The most widely used monomer from this group is acrylonitrile. Copolymers of acrylonitrile and butadiene, generically known as NBR and formerly as GR–A, are sold commercially under the names Paracril, Hycar, etc. Other important monomers in this group are the acrylic and methacrylic esters, such as methyl acrylate, ethyl acrylate, methyl methacrylate, butyl acrylate and 2-ethylhexyl acrylate.

The vinylpyridine can be an unsubstituted monovinylpyridine, e.g., 2-, 3-, or 4-vinylpyridine, or it can be an alkyl-substituted monovinylpyridine, e.g., 2-methyl-5-vinylpyridine, 5-ethyl-2-vinylpyridine, 2-methyl-6-vinylpyridine, and 2-ethyl-4-vinylpyridine. The monovinylpyridine:butadiene rubbers are known generically as PBR regardless of the position of the vinyl group on the ring and regardless of the presence or absence of alkyl groups on the ring.

The fumaric esters have the structure

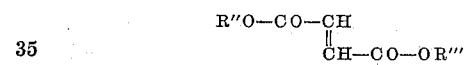

wherein R" and R''' are residues from alcohols which can be alike or different.

The proportion of the said diolefin in rubbery heteropolymers thereof can in some cases be as little as about 35% of the total amount of copolymerizable monomers, the remainder being mono-olefinic compounds. Polymerization is generally but not necessarily effected in aqueous emulsion by well-known techniques.

When the compositions of this invention are used to bond butyl rubber to another rubber each rubber to be bonded is vulcanized in any conventional manner, e.g., with sulfur and the usual compounding ingredients therefor. Of course, each of the two rubbers should reach the desired state of cure under substantially the same time and temperature conditions. This is accomplished by suitably adjusting the compounding ingredients for each rubber, as is well known to those skilled in the art of rubber compounding.

The adducts of maleic anhydride and butyl rubber preferably are made as follows, all parts being by weight.

A charge of 100 parts of butyl rubber and 2–10 parts of maleic anhydride is mixed in a Banbury internal mixer for a few minutes at a low temperature, e.g., below 100° C., to effect uniform dispersion. Then 1,3-dichloro-5,5-dimethyl-hydantoin (also called "Dactin" and "Halane") (2–4 parts), an accelerator for the desired reaction, is added, and the temperature of the mixture is raised as rapidly as possible to 160–175° C., and held there for 30–10 minutes. During this time the adduct is formed. The stock then is dropped from the Banbury and stored at room temperature until used.

This process is disclosed by Paul F. Gunberg in copending application Serial No. 434,073, filed June 2, 1954, now U.S. Patent 2,845,403. Any of the modifications, such as change of accelerator, presence of carbon black, etc., described by Gunberg can be used in making adducts suitable for use in our invention.

Alternatively, the butyl adducts can be made without an accelerator. The rubber and the maleic anhydride are mixed on a cold mill or in a cold Banbury in the proportion shown above. The mixture, with 60 parts of benzene, is then heated in an autoclave for 6 hours at 180–220° C. to form the adduct. The benzene and excess maleic anhydride are separated from the adduct by extraction with methanol and then with water. This operation is carried out at or near room temperature (20° C.) in order to prevent esterification or hydrolysis of the anhydride groups.

We prefer to use the accelerated process in making the adducts because of its ease. However, adducts made by either process are operable in our invention.

The following examples illustrate the invention. All parts are by weight.

*Example 1*

Each of seven stocks was mixed conventionally on a roll mill. Stocks 1 and 7 do not illustrate this invention. Stock 1 is a conventional butyl stock to be used as a tire tread stock in Example 3. Stock 7 is a conventional Hevea carcass or cushion stock used under a tread stock. Stocks 2–6 are new composite stocks which illustrate this invention. Portions of each stock were cured in a press mold at 148° C. for the times shown. Each cured piece (6″ x 6″ x 0.10″) was tested conventionally. The composition and physical properties of the cured stocks are as follows:

| Stock | 1 | 2 | 3 | 4 | 5 | 6 | 7 |
|---|---|---|---|---|---|---|---|
| GR–I 15 a (IIR) | 100 | | | | | | |
| Adduct b | | 90 | 75 | 50 | 25 | 10 | |
| Hevea rubber | | 10 | 25 | 50 | 75 | 90 | 100 |
| Carbon black | 50 | 40 | 40 | 40 | 40 | 40 | 20 |
| Stearic acid | 1 | 0.5 | 0.5 | 0.5 | 0.5 | 0.5 | 2 |
| Zinc oxide | 5 | 10 | 10 | 5 | 5 | 5 | 10 |
| Tuex c | 1.25 | | | | | | |
| MBT d | 0.5 | | | | | | |
| Plasticizer | 4 | | | | | | 4 |
| BLE e | | | | | | | 1.5 |
| MBTS f | | 0.75 | 0.75 | 0.75 | 0.75 | 0.75 | 0.6 |
| Sulfur | 2 | 0.5 | 1.0 | 1.75 | 2.5 | 3 | 3.5 | a Copolymer of isobutylene:isoprene (98:2), according to Rubber Age 74, 561 (1954).
b Dactin-catalyzed adduct of GR–I 15 and maleic anhydride (100:5) made in Banbury.
c Tetramethyl thiuram disulfide.
d 2-mercaptobenzothiazole.
e Condensation product of acetone and diphenylamine.
f 2,2′-dibenzothiazyl disulfide.

| Property | Cure Time, min. | 1 | 2 | 3 | 4 | 5 | 6 | 7 |
|---|---|---|---|---|---|---|---|---|
| Tensile strength (p.s.i.) | 30 | 2,060 | 1,700 | 1,880 | 2,310 | 2,740 | 2,680 | |
|  | 60 | 2,130 | 1,790 | 1,990 | 2,350 | 2,620 | 2,500 | 3,090 |
| Elongation (percent) | 30 | 610 | 500 | 450 | 440 | 480 | 450 | |
|  | 60 | 480 | 470 | 430 | 450 | 480 | 450 | 690 |
| 300% Modulus (p.s.i.) | 30 | 830 | 1,050 | 1,190 | 1,209 | 1,400 | 1,420 | |
|  | 60 | 1,260 | 1,250 | 1,340 | 1,360 | 1,430 | 1,340 | 630 |
| Torsional hysteresis (at 25° C.) | 30 | .495 | .336 | .336 | .301 | .250 | .200 | |
|  | 60 | .491 | .327 | .339 | .315 | .254 | .253 | |
| Torsional hysteresis (at 138° C.) | 30 | .312 | .352 | .338 | .270 | .157 | .122 | |
|  | 60 | .262 | .340 | .312 | .241 | .152 | .136 | |

It is evident that all of these stocks are well cured, and have sufficiently good properties to be commercially valuable. Stocks 2 and 3 are particularly surprising, because it is known that sulfur-cured stocks made from mixtures of a major amount of butyl rubber and a minor amount of a highly unsaturated rubber such as Hevea are very poor. To illustrate this, stocks 8–13 were mixed, cured, and tested like stocks 1–7 except that the temperature of cure was 153° C. The slightly higher temperature, and the high amount of sulfur in stock 10, were chosen in order to try to cure the butyl adequately.

| Stock | 8 | 9 | 10 | 11 | 12 | 13 |
|---|---|---|---|---|---|---|
| GR–I 15 | 100 | 90 | 80 | 50 | 10 | |
| Hevea | | 10 | 20 | 50 | 90 | 100 |
| Carbon black | 50 | 50 | 50 | 50 | 50 | 50 |
| Stearic acid | 2 | 2 | 2 | 2 | 2 | 2 |
| Zinc oxide | 5 | 5 | 5 | 5 | 5 | 5 |
| Tuex | 1.25 | 1.25 | 1.25 | 1.25 | 1.25 | 1.25 |
| MBT | 0.75 | 0.75 | 0.75 | 0.75 | 0.75 | 0.75 |
| Sulfur | 1.5 | 1.5 | 3.0 | 1.5 | 1.5 | 1.5 |

Cure 60 minutes at 153° C.

| Properties | 8 | 9 | 10 | 11 | 12 | 13 |
|---|---|---|---|---|---|---|
| Tensile strength (p.s.i.) | 2,230 | 280 | 400 | 1,130 | 1,630 | 1,950 |
| Elongation (percent) | 510 | 110 | 120 | 130 | 200 | 220 |
| 100% Modulus (p.s.i.) | 280 | 250 | 380 | 880 | 680 | 650 |
| 200% Modulus (p.s.i.) | 600 | | | | 1,630 | 1,730 |

These results show that the all-butyl and all-Hevea stocks (8 and 13) were reasonably adequately cured. Stocks 9 and 10 show the spectacularly bad effect of a small amount of Hevea on the cure of butyl. The Hevea cures so much faster than the butyl that the former has "robbed" the latter of substantially all of the curing agent. Thus, stocks 9 and 10 are presumed to consist of micelles of over-cured Hevea as a dispersed phase in a continuous medium of substantially uncured butyl. Stocks 11 and 12 show that as the proportion of Hevea is further increased the properties of the cured stocks improve again. Probably, even in a mixture of equal amounts of Hevea and butyl, there is sufficient Hevea to form a continuous skeleton of cured Hevea in the stock. None of these six stocks illustrates our invention.

The contrast between stocks 2 and 3, on the one hand, and stocks 9 and 10, on the other, is most important in showing the beneficial effect of the use of our invention in matching the cure rates of two rubbers which have markedly dissimilar amounts of unsaturation.

Instead of Hevea rubber we can use other natural rubbers or highly unsaturated sulfur-vulcanizable synthetic rubbers such as SBR, NBR, PBR, butadiene:acrylate ester rubbers, etc., in making stocks similar to stocks 2–6.

Examples 2 and 3 illustrate applications of our invention in making composite articles, which take advantage not only of the valuable co-curing effect shown in Example 1 but also of the excellent adhesion of our new compositions to each other and to other rubbers.

*Example 2*

Portions of uncured stocks 1–7 (Example 1) were sheeted out 0.10″ thick just before use, and then were cut into pieces 2¼″ x 5″. Composite articles were made by plying two pieces of different stocks together and then covering the two exposed sides with fabric. A strip of aluminum foil was inserted between the two stocks throughout their entire width and for a length of about one inch at one end of the test piece in order to keep the two stocks apart at that end during cure, thus forming two tabs which could be inserted in the jaws of the test apparatus. The fabric was used merely to prevent the stocks from stretching during testing.

The plied specimens then were cured in a press mold for 45 minutes at 145° C. After they had returned to room temperature they were cut lengthwise into one-inch strips. One tab was inserted into each jaw of a Scott tensile tester, and then the pull, in pounds/inch, required to separate the two rubbery layers from each other was determined. In some cases the adhesion between the two rubbers was so remarkably good that the fabric broke or separated from the test piece without separation at the rubber-rubber interface. The stripping tests were carried out at room temperature and at 121° C. (250° F.).

| Specimen | Stock | Composition a | Stock | Composition a | Adhesion | |
|---|---|---|---|---|---|---|
| | | | | | Room Temp. | 121° C. |
| A | 1 | 100:0, Bonded to | 2 | 90:10 | 58 | 8 |
| B | 1 | do | 3 | 75:25 | 30 | 3 |
| C | 1 | do | 4 | 50:50 | 17 | 1 |
| D | 1 | do | 5 | 25:75 | 13 | 1 |
| E | 1 | do | 7 | 0:100 | 6 | 1 |
| F | 2 | 90:10, Bonded to | 3 | 75:25 | b 120 | 10 |
| G | 2 | do | 4 | 50:50 | 26 | 9 |
| H | 2 | do | 5 | 25:75 | 15 | 11 |
| I | 2 | do | 6 | 10:90 | 9 | 5 |
| J | 3 | 75:25, Bonded to | 4 | 50:50 | 26 | 7 |
| K | 3 | do | 5 | 25:75 | 15 | 13 |
| L | 3 | do | 6 | 10:90 | 12 | 6 |
| M | 4 | 50:50, Bonded to | 5 | 25:75 | 45 | b 63 |
| N | 4 | do | 6 | 10:90 | 30 | 22 |
| O | 4 | do | 7 | 0:100 | b 42 | 9 |
| P | 5 | 25:75, Bonded to | 6 | 10:90 | 40 | b 61 |
| Q | 5 | do | 7 | 0:100 | b 100 | b 63 |
| R | 6 | 10:90, Bonded to | 7 | 0:100 | b 117 | b 73 | a In each proportion the first figure is the number of parts of the adduct of butyl and maleic anhydride—except for stock 1, wherein the figure refers to parts of butyl, and the second figure is the number of parts of Hevea.
b Fabric broke or separated from the back of the test piece.

This example brings out the following important points:
(1) Hevea does not bond satisfactorily to butyl (specimen E, a control).
(2) In general, the closer to the same is the composition of the two stocks the better is the adhesion between them.

Instead of Hevea rubber we can use other natural rubbers or highly unsaturated sulfur-vulcanizable synthetic rubbers such as SBR, NBR, PBR, butadiene:acrylate ester rubbers, etc., in making laminated specimens similar to the specimens shown in Example 2.

The minimum acceptable adhesion cannot be given as a single figure for all stocks nor even as a single figure for each temperature, because it varies considerably depending on what the article is to be used for. A tire, for example, must have much better adhesion between layers than a shoe, especially at elevated temperature. However, as a rough guide it can be said that an adhesion of more than about 20 lbs./in. at room temperature is satisfactory, and for many purposes an adhesion of more than about 6 lbs./in. at 121° C. is adequate.

Example 3

A "camel-back" retread composition with a butyl tread (stock 1) and a Hevea cushion (stock 7) was made by means of stocks 2–6 (from Example 1). Stocks 2, 4 and 6 were dissolved separately in Skellysolve B (a petroleum fraction which is chiefly n-hexane according to Griswold et al., Ind. Eng. Chem. 35, 854–7 (1943)). Each cement contained 15% solids. The laminated construction was as follows: Cement #2 was painted onto one side of stock #1; stock #3 was calendered to the cemented side of stock #1; cement #4 was painted onto the exposed side of stock #3; stock #5 was calendered against it; cement #6 was painted onto the exposed side of stock #5; and finally pre-sheeted conventional Hevea stock #7 was calendered against cement #6. Stock #1 in the camelback was 0.340" thick, stocks #3 and #5 were 0.015", and stock #7 was 0.020"; i.e., a total thickness of 0.390". This camelback was pressed against a new, standard, precured Hevea tire whose tread had been buffed down smooth as in conventional retreading and had been coated with a conventional Hevea cement on the buffed surface. Stock #7 was against the cemented surface of the original tire. The retreaded tire was cured conventionally for 90 minutes at 148° C. in a tire recapping mold. The time of heating was longer than that shown in Example 1 because of the great thickness of the tread of the tire and because the tire was heated only from the outside surface. The cured tire was found to perform satisfactorily in road tests. The partly worn tire then was cut open to study the laminated construction. Adhesion was found to be good throughout, and each layer was properly cured so far as could be judged by visual inspection. This indicated that Hevea stock #7 and the precured Hevea stock of the original tire had not robbed butyl stock #1 of sulfur. Thus, this example shows that valuable composite laminated articles can be made, by means of our invention, from butyl rubber and a highly unsaturated rubber which is vulcanizable by sulfur.

Among other examples of such composite articles are tubeless tires whose outer carcass and tread surfaces are made from a highly unsaturated rubber and whose inner surface is made from butyl rubber. Such tires would be exceedingly valuable because they could be so constructed as to take advantage of the best features of both types of rubber.

Having thus described our invention, what we claim and desire to protect by Letters Patent is:

1. A composition comprising a vulcanizable mixture of a highly unsaturated rubber, a vulcanizing agent therefor, a butyl rubber-maleic anhydride adduct, and a metallic oxide curing agent therefor, the butyl rubber being a rubbery copolymer of a major proportion of isobutylene with a minor proportion of a conjugated diolefin hydrocarbon.

2. The vulcanization product of a mixture as set forth in claim 1.

3. A composite laminated article in which a vulcanized sulfur-vulcanizable rubber is bonded to the vulcanized product of a composition as set forth in claim 1.

4. A composite laminated article as set forth in claim 3 in which the sulfur-vulcanizable rubber is a highly unsaturated rubber.

5. A composite laminated article as set forth in claim 3 in which the sulfur-vulcanizable rubber is a butyl rubber composition, the butyl rubber being a rubbery copolymer of a major proportion of isobutylene with a minor proportion of a conjugated diolefin hydrocarbon.

6. A composite laminated article in which a sulfur-vulcanizable, highly unsaturated rubber is bonded to butyl rubber by means of a composition as set forth in claim 1, said butyl rubber being a rubbery copolymer of a major proportion of isobutylene with a minor proportion of a conjugated diolefin hydrocarbon.

7. The composition of claim 1 wherein the weight proportion of highly unsaturated rubber to butyl adduct ranges from about 95:5 to about 5:95.

8. The composition of claim 1 wherein the weight proportion of highly unsaturated rubber to butyl adduct ranges from about 75:25 to about 10:90.

9. The composition of claim 1 wherein at least 4 parts of metallic oxide is used based on 100 parts of the butyl rubber-maleic anhydride adduct.

10. The composition of claim 1 wherein the metallic oxide is zinc oxide.

11. A composite laminated article comprising a butyl rubber composition of a copolymer of a major proportion of isobutylene and a minor proportion of a conjugated diolefin, a vulcanized highly unsaturated rubber, and multiple vulcanized adhesive layers of mixtures of a butyl rubber-maleic anhydride adduct and a highly unsaturated rubber interposed between said butyl rubber and said highly unsaturated rubber, said multiple adhesive layers containing different weight ratios of butyl rubber-maleic anhydride adduct and highly unsaturated rubber, that adhesive layer containing the highest proportion of highly unsaturated rubber being adjacent said vulcanized highly unsaturated rubber and correspondingly that adhesive layer containing the highest proportion of butyl rubber-maleic anhydride adduct being adjacent said butyl rubber composition.

12. The composite laminated article of claim 11 wherein the vulcanized adhesive layers are vulcanized with a mixture of sulfur and a metallic oxide.

13. A method of making a composite laminated article which comprises applying, to a highly unsaturated rubber stock containing a vulcanizing agent, an adhesive composition of a highly unsaturated rubber, a vulcanizing agent therefor, an adduct formed from a rubbery copolymer of a major proportion of isobutylene with a minor proportion of a conjugated diolefin hydrocarbon and maleic anhydride, and a metallic oxide curing agent for said adduct, to form an adhesive surface, adhering a rubbery copolymer of a major proportion of isobutylene with a minor proportion of a diolefin to said adhesive surface to form a laminate, and curing said laminate to form a composite laminated article.

14. The method of claim 13 wherein multiple adhesive layers are interposed between said rubbery copolymer and said highly unsaturated rubber stock, said multiple adhesive layers containing different weight ratios of said adduct and highly unsaturated rubber, the adhesive layer containing the highest proportion of highly unsaturated rubber being adjacent said highly unsaturated rubber stock and correspondingly that adhesive layer containing the highest proportion of said adduct being adjacent said rubbery copolymer.

15. A method of making a composite laminated article which comprises adhering to a highly unsaturated rubber stock containing a vulcanizing agent a composition of a highly unsaturated rubber, a vulcanizing agent therefor, an adduct formed from a rubbery copolymer of a major proportion of isobutylene with a minor proportion of a conjugated diolefin hydrocarbon and maleic anhydride, and a metallic oxide curing agent for said adduct to form a laminate and curing the laminate.

16. A method of making a composite laminated article which comprises adhering to a butyl rubber stock containing a vulcanizing agent, the butyl rubber being a rubbery copolymer of a major proportion of isobutylene with a minor proportion of a conjugated diolefin hydrocarbon, a composition of a highly unsaturated rubber, a vulcanizing agent therefor, an adduct formed from a rubbery copolymer of a major proportion of isobutylene with a minor proportion of a conjugated diolefin hydrocarbon and maleic anhydride, and a metallic oxide curing agent for said adduct to form a laminate and curing the laminate.

References Cited in the file of this patent

UNITED STATES PATENTS

| | | |
|---|---|---|
| 2,575,249 | Connell et al. | Nov. 13, 1951 |
| 2,583,387 | Morrissey et al. | Jan. 22, 1952 |
| 2,634,256 | Sparks et al. | Apr. 7, 1953 |
| 2,775,537 | Wilson et al. | Dec. 25, 1956 |
| 2,824,038 | Wilson et al. | Feb. 18, 1958 |
| 2,845,403 | Gunberg | July 29, 1958 |